United States Patent Office 3,210,342
Patented Oct. 5, 1965

3,210,342
PREPARATION OF 4-ALKYLATED STEROID COMPOUNDS
Robert P. Graber, Minneapolis, and Susumu Nakanishi, Hopkins, Minn., assignors to General Mills, Inc., a corporation of Delaware
No Drawing. Filed June 4, 1963, Ser. No. 285,253
14 Claims. (Cl. 260—239.55)

This invention relates to a novel method of preparing 4-alkylated steroid compounds and to novel intermediates in the reaction sequence and in particular to 4-monoalkyl and 4,4-dialkyl steroid compounds. Illustrative of these final products are 4,6α,16α-trimethyl-5-pregnene-17α-ol-3,20-dione and the acyl derivates thereof and 4,4,6,16α-tetramethyl-5-pregnene-17α-ol-3,20-dione and the acyl derivatives thereof.

The 4-alkylated products are physiologically active and are further described in commonly assigned copending U.S. application Serial No. 245,380, filed December 18, 1962, by S. Nakanishi. These 4-alkylated compounds, in particular the 4,4,6,16-tetraalkyl-5-pregnene steroids, are progrestationally active and thus are of clinical value for the prevention of habitual or threatened abortion, the treatment of dysmennorhoes, pre-menstrual tension, as ovulation suppressing agents and other sex cylic regulatory purposes.

In addition to their usefulness in themselves as highly active progestational horomones, these 4-alkylated compounds are valuable intermediates in the preparation of other steroids. The compounds are of great value for the chemical and/or microbiological conversion to the anti-inflammatory corticoid hormones, for example, by introduction of oxygen into position 11 of the molecule by fermentation with known microorganisms to provide an 11-hydroxy compound in which the 11-hydroxy group may be further oxidized chemically to a ketone group.

The aforementioned copending application describes one method of preparation of the 4-alklated products. It has now been discovered that such product may be prepared in high overall yield by a different process through different intermediates.

It is therefore an object of this invention to provide a novel method of preparing biologically active 4-alkylated steroid compounds.

It is also an object of this invention to provide novel intermediates in the preparation of such 4-alkylated products.

Briefly the invention consists in the conversion of a 6,16-dialkyl-pregnane 3β,5α,17α,20-tetrol to 17α,20-ketal form which is then oxidized to the corresponding 3-keto-5α-ol and dehydrated to the Δ⁴-3-keto derivative. This compound is then alkylated with an alkyl halide to provide either the 4-monoalkyl or 4,4-dialkyl product which is then hydrolyzed under acid conditions and oxidized to the final product, either a 4,6,16-trialkyl-17α-hydroxy-3,20-dione or a 4,4,6,16-tetraalkyl - 17α - hydroxy - 3,20-dione. If desired, the 17-hydroxy group may then be acylated to provide the corresponding 17-acyloxy compound.

The reaction sequence can but be illustrated by means of the following sequence:

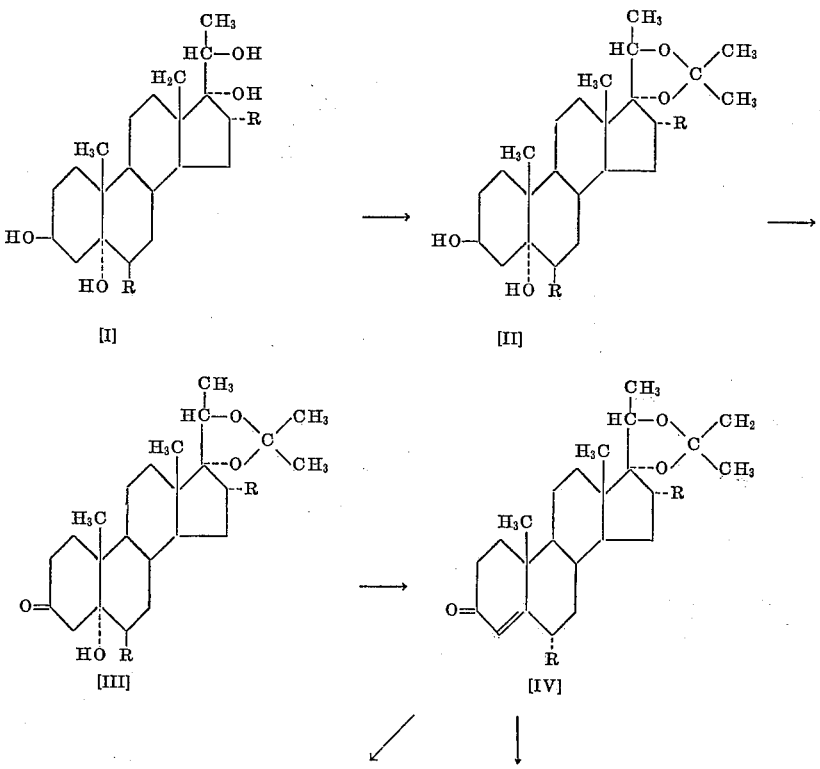

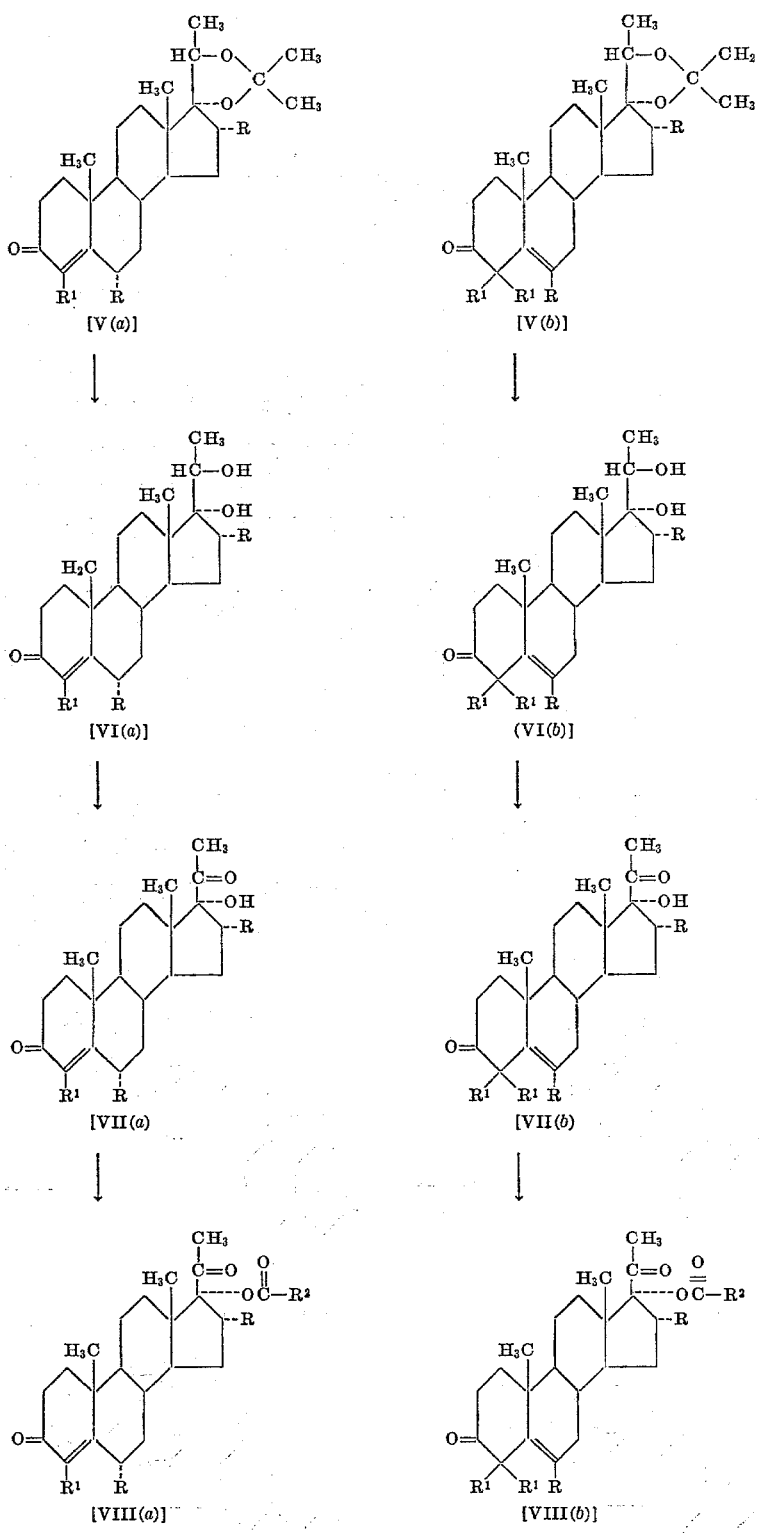

In the foregoing reaction sequence, R is an alkyl group having from 1 to 8 carbon atoms and both R groups in the 6 and 16 position may be the same or different alkyl groups, $R^1$ is an alkyl group having from 1 to 8 carbon atoms, and $R^2$ is selected from the group consisting of alkyl, cycloalkyl, aralkyl and alkoxyaralkyl groups in which the alkyl group has from 1 to 12 carbon atoms and the aryl group is generally phenyl. Illustrative of the alkyl groups of R and $R^1$ are methyl, ethyl, propyl, isopropyl, butyl, isobutyl, pentyl, hexyl, heptyl, and octyl. Illustrative of the ester groups in the 17-position are acetate, caproate, propionate, cyclopentyl propionate, phenyl propionate, p-propoxyphenyl propionate, p-hexoxyphenyl propionate and p-dodecoxyphenyl propionate.

The intermediates provided in the reaction sequence may be illustrated by the following formulae:

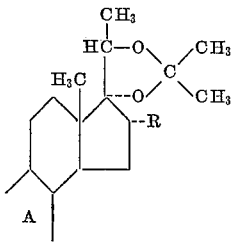

and

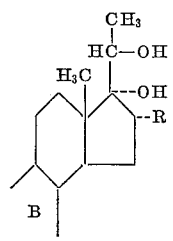

where A is selected from the group consisting of

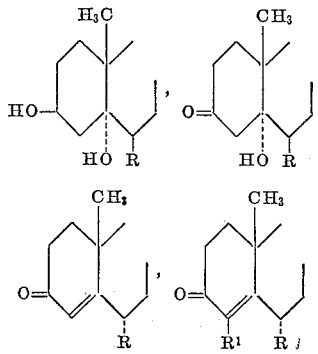

and

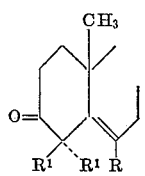

and B is selected from the group consisting of

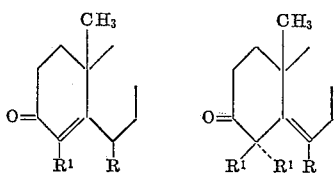

and R and R¹ are alkyl groups having from 1 to 8 carbon atoms.

The starting material for the present invention is a 6β,16α-dialkyl-pregnane-3β,5α,17α,20-tetrol, which may be represented by the formula

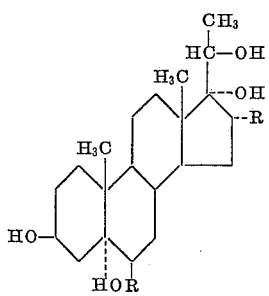

where R is an alkyl group having from 1 to 8 carbon atoms. The preparation of this starting material is disclosed in my copending application with M. B. Meyers, U.S. Serial No. 122,092 filed July 6, 1961, now U.S. Patent 3,123,600, the disclosure of which is incorporated herein by reference. As disclosed therein, the tetrol product may be prepared from 16-dehydropregnenolone acetate or the 3-alcohol. The preparation proceeds by Grignard alkylation and in situ enol acetylation of the 16-dehydropregnenolone acetate to the 16α-alkyl-5,17 (20)-pregnadien-3,20-diol diacetate. Epoxidation then provides the 5,6:17α,20-dioxido-3,20-diacetates which on alkaline hydrolysis produce the 5,6-oxido-16α-alkylpregnan-3β,17α-diol-20-ones which are then acetylated to the 3β-acetates. Acid-catalyzed scission then affords the tetrolone, 16α-alkylpregnan-3β,5α,6β,17α-tetrol-20-one which upon reclosure of the trans 5,6-diol system provides the 5α,6α-oxido-16α-alkylpregnan-3β,17α-diol-20-one. Reduction with sodium borohydride affords the 5α,6α-oxido-3β,17α,20-triol and Grignard opening of the oxide grouping establishes the 6β-alkyl in 6β,16α-dialkylpregnan-3β,5α,17α,20-tetrol, the starting material for the present invention.

As previously indicated, the starting material for the present invention is then converted to the 17α, 20-ketal form. This is accomplished by an acid catalyzed reaction, i.e., hydrochloric acid, of 6β,16α-dialkylpregnan-3β,5α,17α,20ξ-tetrol with acetone to furnish the 17α,20ξ-isopropylidenedioxy derivative by simply boiling the reaction mixture for a few minutes and subsequently letting the mixture stand at room temperature, i.e. overnight. The acetonide is then subjected to a Jones' oxidation (chromic acid in acetone) to provide the 3-ketone.

The 17α,20ξ-isopropylidenedioxy derivative is stable toward base treatment and elimination of the 5α-hydroxy group is carried out by treatment with a dilute basic alcohol solution, such as ethanol or methanol containing an alkali metal hydroxide such as sodium or potassium hydroxide. This may be done at room temperature overnight. However, the elimination step also proceeds at refluxing temperatures for about 30 minutes to 1 hour using a 0.1 N solution of sodium or potassium hydroxide in ethanol or methanol.

The thus formed Δ⁴-3-keto derivative is then alkylated with an alkyl halide to provide a 4-monoalkyl product or a 4,4-dialkyl product. An inert solvent such as tert-butanol is employed with the presence of sodium or potassium tert-alkoxide. The 4,4-dialkylation is achieved by treatment at 0–35° C. for about 4 to 20 hours under nitrogen. Increased yields may be obtained by treating, prior to addition of the alkylating agent, the acetonide-Δ⁴-3-ketone with potassium or sodium alkoxide in tert-butanol for from 1 to 5 hours under nitrogen, to form a conjugated anion. The 4-monoalkylation is favored over dialkylation by (a) employing an alkyl chloride rather than the iodide which appears to slow down the rate of the second alkylation or (b) employing a high temperature, such as the refluxing temperature of tert.-butanol in which case increased steric hindrance of the alkyl group appears to prevent the second alkylation.

The acetonide group is then removed by hydrolysis under acid conditions. This hydrolytic removal of the acetonide group is preferably accomplished by refluxing the acetonide in aqueous acetic acid for 2 to 3 hours. Other acids such as formic acid may be employed, however.

The thus obtained 17α,20ξ-glycol is then oxidized to a 17-hydroxy-20-ketone system by treatment with (a) chromic acid in acetone, with or without the addition of pyridine, (b) N-bromo-succinimide or (c) N-bromo-acetamide. The oxidation with chromic acid in acetone is preferably carried out at 0 to 10° C. for one to 3 minutes. The other oxidations with N-bromo-succinimide or N-bromo-acetamide requires the use of an aqueous ornic solvent such as acetone, dioxane or tert.-butanol at mperatures of 0 to 30° C. for 6 to 20 hours.

If desired, the 17-hydroxy group may then be acylated. cetylation of the 17-hydroxy group may be accomplished / treatment with acetic anhydride and p-toluenesulfonic id in glacial acetic acid at 10 to 30° C. for 6 to 24 ours. Other acylating agents may be employed to provide the particular ester desired corresponding to those iters previously set forth.

The invention can be further illustrated by means of the following examples which are intended as illustrative f the process and products of the present invention and re not to be construed as limiting the invention. For urposes of simplicity of illustration, reference is made erein only to the methyl compounds and acetate esters.

Example I

Ten grams (10 g.) of a 6$\beta$,16$\alpha$-dimethylpregnane-6,5$\alpha$,17$\alpha$,20$\xi$-tetrol, M.P. 210–212° C., were dissolved 350 ml. of acetone, 2 ml. of concentrated hydrochloric cid was added and the mixture was gently boiled for 5 inutes and then was kept at room temperature for 6 hours.

Dilution with water gave crystalline material which was ltered washed well with water and dried to give 11.035 (99%), M.P. 116.5–126.5° C., $\lambda_{max.}^{KBr}$ 2.92, 8.25, 8.51, 9.14, 9.60, 9.75, 9.91, 11.51$\mu$ ecrystallization from n-hexane gave the analytical sample of 17$\alpha$,20$\xi$-isopropylidenedioxy-6$\beta$,16$\alpha$-dimethylpregnane-3$\beta$,5$\alpha$-diol having a melting point of 121–122° C., $[\alpha]_D^{27.5°}$ −54.6° (c.=1, CHCl$_3$), $\lambda_{max}^{KBr}$ 2.92, 8.25, 8.51, 9.14, 9.60, 9.75, 9.91, 11.51$\mu$

*Analysis.*—Calcd. for $C_{26}H_{44}O_4 \cdot C_3H_6O$: C=72.76, H=10.53. Found: C=72.50, H=10.61.

Example II

Under a nitrogen atmosphere, 10 g. of 17$\alpha$,20$\xi$-isopropylidenedioxy - 6$\beta$,16$\alpha$ - dimethylpregnane - 3$\beta$,5$\alpha$-diol repared in Example I, were dissolved in 700 ml. of cetone and cooled to 10° C. Then 15 ml. of 8 N hromic acid reagent was added in one portion. After 3 inutes, a well shaken slurry of 12.5 g. sodium bisulfite 1 20 ml. of water was added as quickly as possible. fter the mixture was stirred for an additional one minte, it was poured into 4.0 liters of water and the thus ormed crystals were filtered, washed well with water and ried to give 9.82 g. (99%), M.P. 174–178.5° C., $_{max.}^{KBr}$ 2.96, 5.84, 8.25, 8.50, 8.57, 9.14, 9.62, 9.70 9.93, 1.51$\mu$ wo recrystallizations from acetone and n-hexane gave he analytical sample of 17$\alpha$,20$\xi$-isopropylidenedioxy-$\beta$,16$\alpha$-dimethylpregnane-5$\alpha$-ol-3-one having M.P. 201.5–02.5° C., $[\alpha]_D^{29°}$ −35.2° (c.=1, CHCl$_3$), $_{max.}^{KBr}$ 2.96, 5.84, 8.25, 8.50, 8.57, 9.14, 9.62, 9.70, 9.93, nd 11.51$\mu$

*Analysis.*—Calcd. for $C_{26}H_{52}O_4$: C=74.60, H=10.11. ound: C=74.29, H=10.03.

Example III

Nitrogen gas was bubbled into a solution of 9 g. of 7$\alpha$,20$\xi$-isopropylidenedioxy - 6$\beta$,16$\alpha$ - dimethylpregnane-$\alpha$-ol-3-one obtained in Example II, in 700 ml. of abolute alcohol for 2 minutes. Then 50 ml. of 0.1 N aque-us sodium hydroxide solution was added and the mixure was kept at room temperature for 18 hours. Then .2 ml. of acetic acid was added and pH was kept around eutral. The mixture was concentrated to about half its olume by means of a rotary evaporator at about 10–12 nm. Hg. This solution was diluted with two liters of vater and extracted with ethyl acetate. The extracts vere washed, dried, and evaporated to give 6.85 g. 80%), M.P. 153–161° C., $\lambda_{max.}^{KBr}$ no hydroxy, 5.98, 6.21, 7.90, 8.00, 8.12, 8.26, 8.36 8.52, 9.11, 9.25, 9.46, 9.61, 9.70, 9.92 and 11.52$\mu$ Recrystallization from aqueous acetone furnished 17$\alpha$,20$\xi$ - isopropylidenedioxy - 6$\alpha$,16$\alpha$ - dimethyl-4-pregnene-3-one, M.P. 167–169° C., $[\alpha]_D^{26°}$ −5.7° (c.=1, CHCl$_3$), $\lambda_{max.}^{EtOH}$ 242 m$\mu$, $\epsilon$=16,750, $\lambda_{max.}^{KBr}$ 5.98, 6.21, 7.90, 8.00, 8.12, 8.26, 8.36, 8.52, 9.11, 9.25, 9.46, 9.61, 9.70, 9.92, and 11.52$\mu$

*Analysis.*—Calcd. for $C_{26}H_{40}O_3$: C=77.95, H=10.07. Found: C=78.14, H=10.09.

Example IV

Twelve grams of 17$\alpha$,20$\xi$-isopropylidenedioxy-6$\alpha$,16$\alpha$-dimethyl-4-pregnene-3-one were dissolved at room temperature in 360 ml. of tert.-butanol containing 7 g. of potassium metal and the mixture was stirred for 5 hours under a nitrogen atmosphere. Then 30 ml. of methyl iodide was added and the mixture was stirred for 10 minutes at room temperature and then was left standing for 16 hours under a nitrogen atmosphere at room temperature without external cooling or heating. This was diluted with about 300 ml. of water and excess methyl iodide and some tert.-butanol were evaporated by means of a rotary evaporator (10–12 mm. Hg) for 30 minutes. After further dilution with water, the product was extracted with ether. The extracts were washed, dried and evaporated to give 12.31 g. (95%), M.P. 144–155° C., $\lambda_{max.}^{KBr}$ 2.87, 5.85, 6.88, 7.22$\mu$, $\lambda_{max.}^{EtOH}$ no U.V.

mass spectrum showed strong parent peak corresponding to the molecular weight of 428. Purification by silica gel chromatography (elution with 5% ethyl acetate in benzene) gave a compound of M.P. 187–190° C. Recrystallization from n-hexane and acetone gave the analytical sample of 17$\alpha$,20$\xi$-isopropylidenedioxy-4,4,6,16$\alpha$-tetramethyl-5-pregnene-3-one having M.P. 190–191° C., $[\alpha]_D$ −78.8° (c.=1, CHCl$_3$), no U.V. absorption, $\lambda_{max.}^{KBr}$ 5.86, 6.82, 6.91, 7.26, 7.87, 8.25, 8.45, 9.12, 9.25, 9.66, 9.92, 11.52$\mu$

*Analysis.*—Calcd. for $C_{28}H_{44}O_3$: C=78.45, H=10.35. Found: C=78.22, H=10.32.

Example V

17$\alpha$,20$\xi$-isopropylidenedioxy-6$\alpha$,16$\alpha$-dimethyl - 4 - pregnene-3-one, prepared in Example III, was treated in the same manner described in Example IV, but substituting methyl chloride for methyl iodide to give the corresponding 17$\alpha$,20$\xi$-isopropylidenedioxy - 4,6$\alpha$,16$\alpha$ - trimethyl - 4-pregnene-3-one.

$\lambda_{max.}^{KBr}$ 5.95, 6.21, 7.22$\mu$, $\lambda_{max.}^{EtOH}$ 251 m$\mu$ Treatment of 3 g. of 17$\alpha$,20$\xi$-isopropylidenedioxy-6$\alpha$, 16$\alpha$-dimethyl-4-pregnene-3-one in 50 ml. of t-butyl alcohol with a boiling solution of potassium t-butoxide, prepared by dissolving 620 mg. of potassium in 30 ml. of tert.-butyl alcohol, followed by the slow addition of 2 ml. of methyl iodide and 2 hours reflux also gave 17$\alpha$,20$\xi$-isopropylidenedioxy-4,6$\alpha$,16$\alpha$-trimethyl-4-pregnene-3-one.

Example VI

Ten grams of 17$\alpha$,20$\xi$-isopropylidenedioxy-4,4,6,16$\alpha$-tetramethyl-5-pregnene-3-one, were suspended in 350 ml. of acetic acid and 200 ml. of water and the mixture were refluxed for 3 hours, during which period most of the solid dissolved. Dilution with water gave a crystalline material which was filtered, washed well with water and dried to give 4,4,6,16$\alpha$-tetramethyl-5-pregnene - 17$\alpha$,20$\xi$-diol-3-one, 8.56 g. (94%), M.P. 98–107° C. Chromatography on silica gel and recrystallization from n-hexane and acetone gave the analytical sample having M.P. of 142–143° C., $\lambda_{max}^{KBr}$ 2.85, 5.88, 6.85, 7.22, 9.00, 9.75, 9.98, 10.23μ, no U.V. absorption, $[\alpha]_D$ −41° (c.=1, CHCl$_3$)

*Analysis.*—Calcd. for $C_{25}H_{40}O_3$: C=77.27, H=10.38. Found: C=77.10, H=10.51.

Similar treatment of the product of Example V gave 4,6α,16α-trimethyl-4-pregnene-17α,20ξ-diol-3-one, M.P. 94–96° C., $\lambda_{max}^{KBr}$ 2.90, 6.01, 6.20μ, $\lambda_{max}^{alc.}$ 251 mμ

Example VII

A suspension of 4.3 g. of 17α,20ξ-isopropylidenedioxy-4,4,6,16α-tetramethyl-5-pregnene-3-one, obtained in Example IV, in 170 ml. of glacial acetic acid and 100 ml. of water was refluxed for three hours and then the mixture was kept at room temperature overnight (17 hours). After dilution with water, the product was extracted with ether. The extracts were washed with water, 5% sodium bicarbonate solution, sodium chloride solution to neutrality, dried over magnesium sulfate, filtered and evaporated to give 3.842 gm., 106–109°. Two recrystallizations from methanol gave 4,4,6,16α-tetramethyl-5-pregnene-17α,20ξ-diol-3-one, having M.P. of 142–143°, $\lambda_{max}^{KBr}$ 2.85, 5.88, 7.22, 9.00, 9.75, 9.98, 10.23μ which was identical with the material obtained in Example VI.

Example VIII

A solution of 300 mg. of 4,4,6,16α-tetramethyl-5-pregnene-17α,20ξ-diol-3-one, obtained in Example VI, in 40 ml. of acetone was cooled to 10° and dry nitrogen gas was bubbled in for two minutes and then under a nitrogen atmosphere, 0.3 ml. of 8 N chromic acid reagent was added at once and the mixture was stirred for three minutes.

A well stirred slurry of 400 mg. of sodium bisulfite in 7 ml. of water was added and the mixture was stirred for an additional one minute, poured into ice water and the product extracted with ether to give 285 mg. (96%), M.P. 177–180°. Recrystallization from n-hexane and acetone furnished a first crop of 4,4,6,16α-tetramethyl-5-pregnene-17α-ol-3,20-dione, 208 mg. (70%), M.P. 181–182°, $[\alpha]_D^{28°}$ −73° (c.=1, CHCl$_3$), no U.V. absorption, $\lambda_{max}^{KBr}$ 2.87, shoulder at 2.99, 5.95, 6.88, 7.22μ

Mass spectrum agreed with the structure assigned.

*Analysis.*—Calcd. for $C_{25}H_{38}O_3 \cdot H_2O$: C=74.22, H=9.96. Found: C=74.27, H=9.85.

Example IX

One gram of 4,4,6,16α-tetramethyl-5-pregnene-17α,20ξ-diol-3-one, prepared in Example VI, was dissolved in 120 ml. of acetone and 35 ml. of water, and treated with 2 g. of N-bromosuccinimide at room temperature for 17 hours.

Dilution with water gave a crystalline material, which was filtered, washed well with water and dried to give 986 mg., M.P. 91–103° C., $\lambda_{max}^{KBr}$ 2.87, 5.95, 6.88, 7.22μ no U.V. absorption. Repeated recrystallizations from n-hexane and acetone furnished the pure compound having M.P. of 181–182° which was identical with the product obtained in Example VIII.

Example X

Nine hundred mg. of 4,4,6,16α-tetramethyl-5-pregnene-17α-ol-3,20-dione were dissolved in 30 ml. of acetic acid and 9 ml. of acetic anhydride. Then 360 mg. of p-toluenesulfonic acid monohydrate was added and the mixture kept at room temperature for 18 hours. Dilution with water gave a crystalline material, which was filtered, washed and dried to give 978 mg. (98%), M.P. 98–104° C., $\lambda_{max}^{KBr}$ 5.75, 5.85, 8.01μ, no U.V. absorption Purification by silica gel chromatography and recrystallization from aqueous methanol gave 820 mg., M.P. 154–155.5° C., $\lambda_{max}^{KBr}$ 5.75, 5.85, and 8.01μ, no U.V. absorption

*Analysis.*—Calcd. for $C_{27}H_{40}O_4$: C=75.66, H=9.41. Found: C=75.62, H=9.39.

It is to be understood that the invention is not to be limited to the exact details of operation or the exact compounds shown and described as obvious modifications and equivalents will be apparent to those skilled in the art and the invention is to be limited only by the scope of the appended claims.

The embodiments of the invention in which an exclusive property or privilege is claimed are defined as follows:

1. A steroid compound having the formula

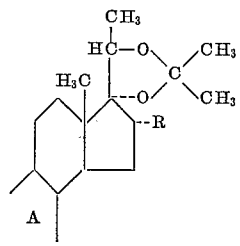

where A is selected from the group consisting of

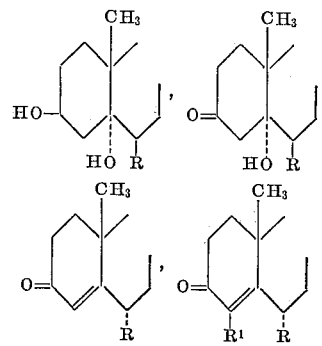

and

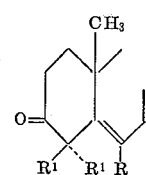

where R and R$^1$ are alkyl groups having from 1 to 8 carbon atoms.

2. A steroid compound as defined in claim 1 in which R and R$^1$ are methyl.

3. A steroid compound of the formula

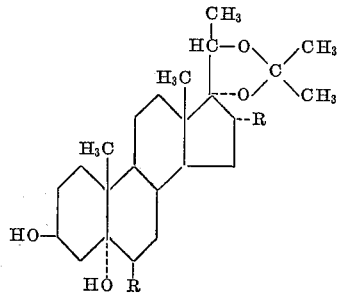

where R is an alkyl group having from 1 to 8 carbon atoms.

4. A steroid compound of the formula

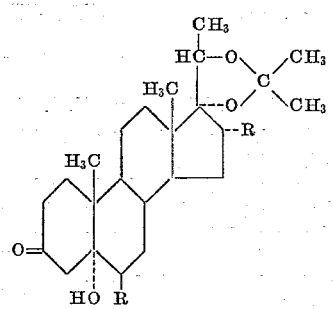

where R is an alkyl group having from 1 to 8 carbon atoms.

5. A steroid compound of the formula

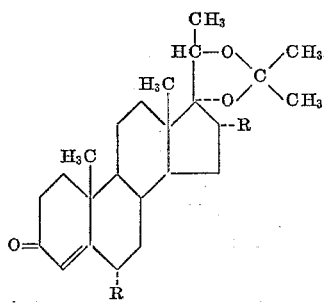

where R is an alkyl group having from 1 to 8 carbon atoms.

6. A steroid compound of the formula

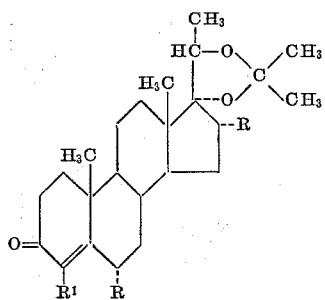

where R and R¹ are alkyl groups having from 1 to 8 carbon atoms.

7. A steroid compound of the formula

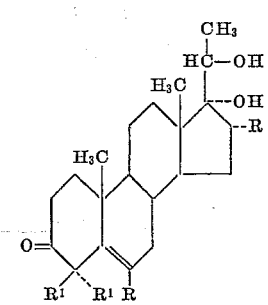

where R and R¹ are alkyl groups having from 1 to 8 carbon atoms.

8. A steroid compound having the formula

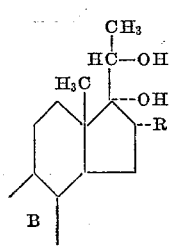

where B is selected from the group consisting of

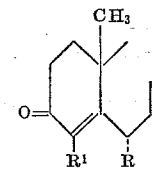

and

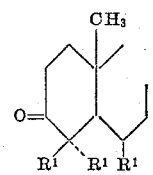

where R and R¹ are alkyl groups having from to 1 to 8 carbon atoms.

9. A steroid compound as defined in claim 8 in which R and R¹ are methyl.

10. A steroid compound of the formula

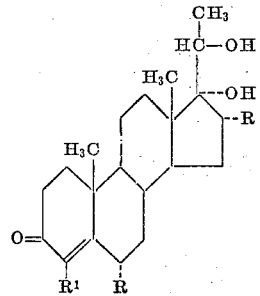

where R and R¹ are alkyl groups having from 1 to 8 carbon atoms.

11. In a process of preparing a compound selected from the group consisting of

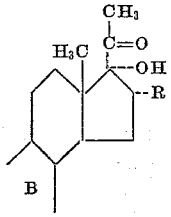

and

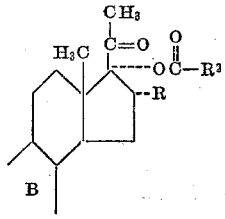

where B is selected from the group consisting of

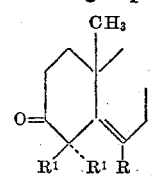

and

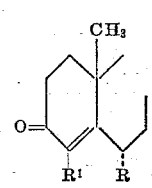

R and R¹ are alkyl groups having from 1 to 8 carbon atoms and R² is selected from the group consisting of alkyl, cycloalkyl, aralkyl and alkoxyaralkyl groups in which the alkyl group has from 1 to 12 carbon atoms and the acyl group is phenyl, the sequence of steps comprising (a) heating in the presence of hydrochloric acid an acetone solution of

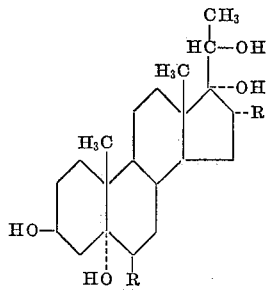

thereby providing

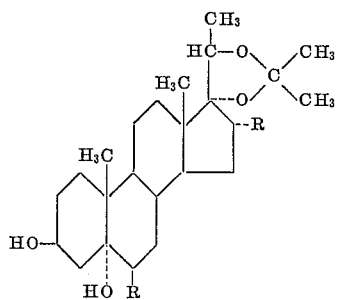

where R is as previously defined, (b) treating an acetone solution of the product of (a) with chromic acid thereby oxidizing the 3-hydroxyl group to a 3-ketone group providing

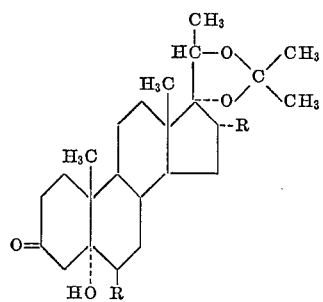

where R is as previously defined, (c) treating the product of (b) with an alcoholic solution of an alkali metal hydroxide thereby eliminating the 5α-hydroxy group and providing

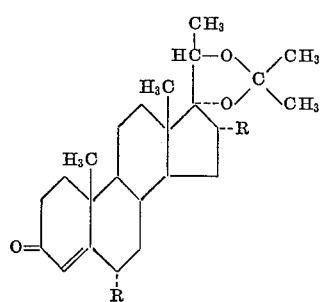

where R is as previously defined, (d) treating the product of (c) with an alkyl halide in which the alkyl group has from 1 to 8 carbon atoms thereby providing

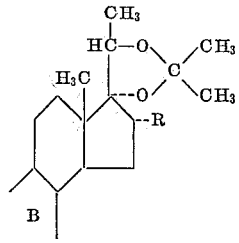

where B is selected from the group consisting of

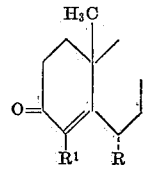

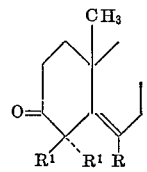

and R and R¹ are alkyl groups having from 1 to 8 carbon atoms, (e) hydrolyzing the product of (d) under acid conditions, said acid being selected from the group consisting of acetic and formic acids, thereby providing

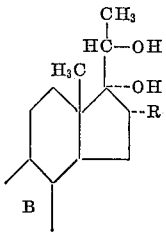

where B and R are as previously defined and (f) treating the product of (e) with an oxidizing agent selected from the group consisting of chromic acid, N-bromo-succinimide and N-bromo-acetamide thereby oxidizing the 17α,20β-glycol to a 17α-hydroxy-20-ketone of the formula

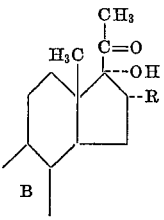

where B and R are as previously defined.

12. A process as defined in claim 11 in which R and R¹ are methyl.

13. A process of preparing

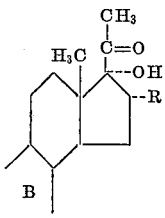

where B is selected from the group consisting of

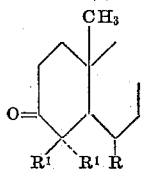

and

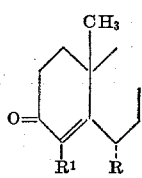

and R and R¹ are alkyl groups having from 1 to 8 carbon atoms, comprising treating with chromic acid in acetone a 17α,20β-glycol of the formula

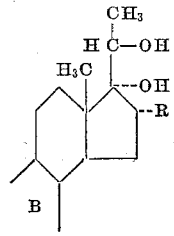

where B and R are as previously defined.

14. A process as defined in claim 13 in which R and R¹ are methyl.

References Cited by the Examiner

Graber et al.: "Journal Org. Chem. (1962), vol. 27, pages 2534–2541 relied on.

Tschesche et al.: "Ann. Chem.," vol. 199 (1961), page 642 relied on.

LEWIS GOTTS, *Primary Examiner.*

UNITED STATES PATENT OFFICE
CERTIFICATE OF CORRECTION

Patent No. 3,210,342                           October 5, 1965

Robert P. Graber et al.

It is hereby certified that error appears in the above numbered patent requiring correction and that the said Letters Patent should read as corrected below.

Column 1, line 15, for "derivates" read -- derivatives --; line 25, for "dysmennorhoes" read -- dysmennorhoea --; columns 1 and 2, formula [I], and column 3, formula [VI(a)], for that portion of the formula, each occurrence, reading

           read           

column 2, formula [IV], and columns 3 and 4, formula [V(b)], for the upper left-hand portion of the formula, each occurrence, reading

           read           

columns 3 and 4, formulas [V(b)], [VI(b)], [VII(b)] and [VIII(b)], for the lower left-hand portion of the formula, each occurrence, reading

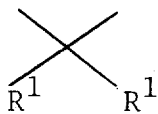           read           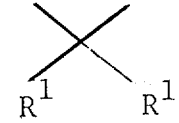

same columns 3 and 4, formula [VIII(b)], for the upper right-hand portion of the formula reading

           read           

column 5, lines 50 to 56, the lower right-hand portion of the formula reading

           read           

3,210,342 column 8, line 67, for "were" read -- was --; column 11, lines 16 to 27, for the lower left-hand portion of the formula reading

|
|
R                    read                    |
                                              R column 12, lines 11 to 17, and column 15, lines 2 to 9, the formula, each occurrence, should appear as shown below instead of as in the patent:

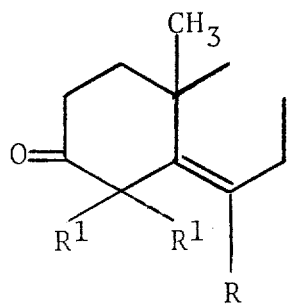

Signed and sealed this 13th day of September 1966.

(SEAL)
Attest:

ERNEST W. SWIDER                    EDWARD J. BRENNER
Attesting Officer                   Commissioner of Patents